US012739700B2

(12) United States Patent
Chen et al.

(10) Patent No.: US 12,739,700 B2
(45) Date of Patent: Sep. 15, 2026

(54) COMMUNICATION METHOD, DEVICE AND APPARATUS BASED ON WIRELESS AD-HOC NETWORK

(71) Applicant: Shenzhen Ziwu Chuangxin Technology Co., Ltd., Shenzhen (CN)

(72) Inventors: Wenyue Chen, Shenzhen (CN); Yuqun Cai, Shenzhen (CN)

(73) Assignee: Shenzhen Ziwu Chuangxin Technology Co., Ltd., Shenzhen (CN)

( * ) Notice: Subject to any disclaimer, the term of this patent is extended or adjusted under 35 U.S.C. 154(b) by 318 days.

(21) Appl. No.: 18/676,265

(22) Filed: May 28, 2024

(65) Prior Publication Data

US 2025/0338174 A1 Oct. 30, 2025

(30) Foreign Application Priority Data

Apr. 24, 2024 (CN) ......................... 202410500622.4

(51) Int. Cl.
*H04W 28/08* (2023.01)
*H04W 28/12* (2009.01)
*H04W 72/0446* (2023.01)

(52) U.S. Cl.
CPC ....... *H04W 28/0883* (2020.05); *H04W 28/12* (2013.01); *H04W 72/0446* (2013.01)

(58) Field of Classification Search
CPC ............. H04W 28/0883; H04W 28/12; H04W 72/0446
See application file for complete search history.

(56) References Cited

U.S. PATENT DOCUMENTS

2008/0151801 A1* 6/2008 Mizuta .................. H04W 52/46 370/311
2022/0311693 A1* 9/2022 Thubert .............. H04L 12/4633

FOREIGN PATENT DOCUMENTS

CN 107872864 A * 4/2018 ........ H04W 52/0225

OTHER PUBLICATIONS

Henry et al., "TGbi—Epoch Structure Proposal", IEEE 802.11-24/0681r1 (Year: 2024).*

* cited by examiner

*Primary Examiner* — Joseph A Bednash
(74) *Attorney, Agent, or Firm* — Hawaii Patent Services; Nathaniel K. Fedde; Kenton N. Fedde

(57) ABSTRACT

A communication method, device and apparatus based on wireless ad-hoc network. The method comprises: collecting real time network topological information of a plurality of candidate communication terminals; screening the target communication terminal and the communication terminals for a target network central node and a plurality of network sub-central nodes, determining current central communication terminal and initial communication terminals corresponding to the plurality of network sub-central nodes; generating a list of centrality and generating a forwarding sequence table according to the list of centrality, generating a data time slot scheduling table based on the data time slot scheduling information, sending or forwarding the list of centrality, the forwarding sequence table and the data time slot scheduling table in the target RF channel; sending management and control instructions in the target RF channel and controlling all the initial communication terminals in the network cluster to execute the management and control instruction.

10 Claims, 2 Drawing Sheets

Figure 1:
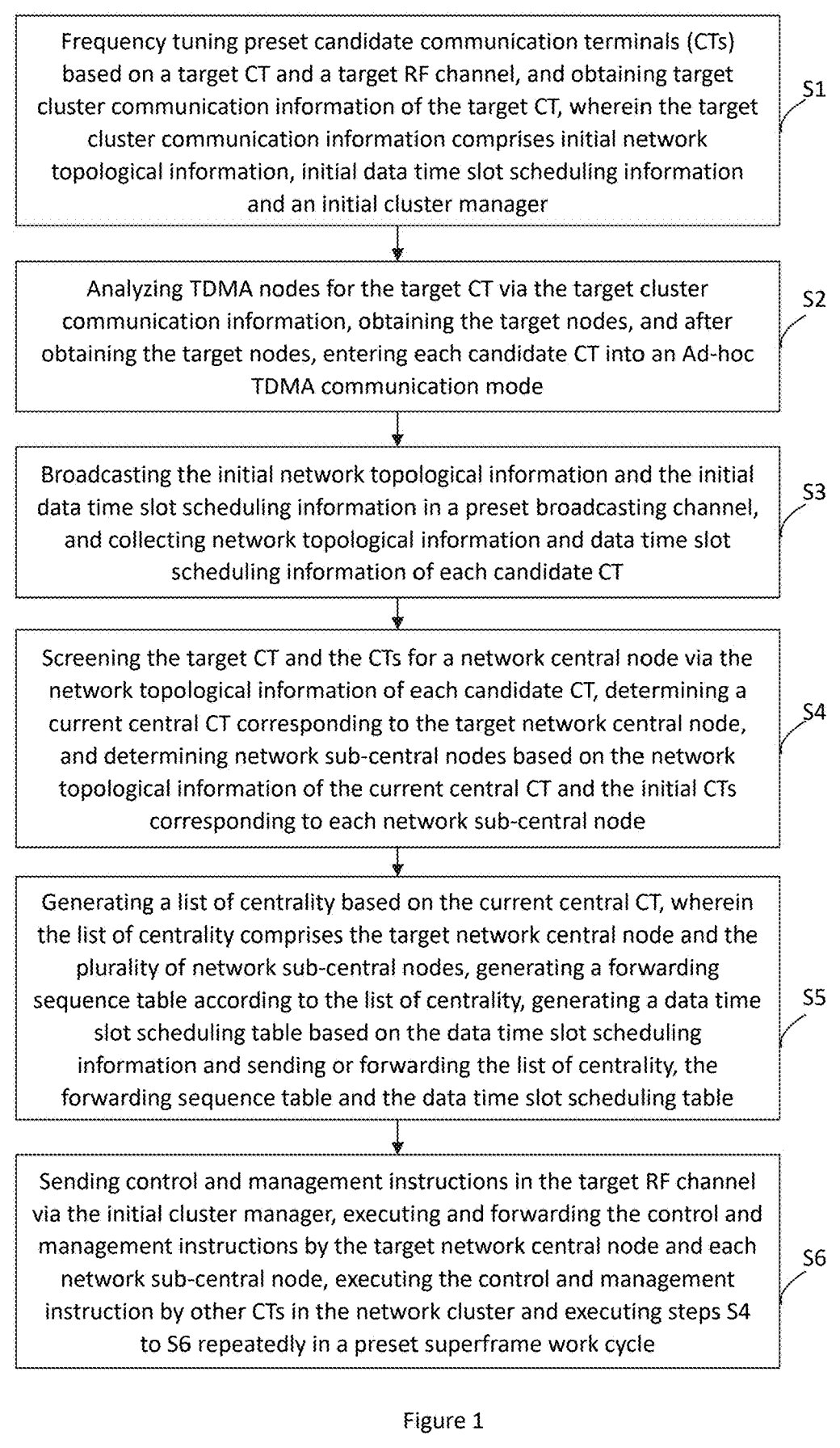

Frequency tuning preset candidate communication terminals (CTs) based on a target CT and a target RF channel, and obtaining target cluster communication information of the target CT, wherein the target cluster communication information comprises initial network topological information, initial data time slot scheduling information and an initial cluster manager

S1

Analyzing TDMA nodes for the target CT via the target cluster communication information, obtaining the target nodes, and after obtaining the target nodes, entering each candidate CT into an Ad-hoc TDMA communication mode

S2

Broadcasting the initial network topological information and the initial data time slot scheduling information in a preset broadcasting channel, and collecting network topological information and data time slot scheduling information of each candidate CT

S3

Screening the target CT and the CTs for a network central node via the network topological information of each candidate CT, determining a current central CT corresponding to the target network central node, and determining network sub-central nodes based on the network topological information of the current central CT and the initial CTs corresponding to each network sub-central node

S4

Generating a list of centrality based on the current central CT, wherein the list of centrality comprises the target network central node and the plurality of network sub-central nodes, generating a forwarding sequence table according to the list of centrality, generating a data time slot scheduling table based on the data time slot scheduling information and sending or forwarding the list of centrality, the forwarding sequence table and the data time slot scheduling table

S5

Sending control and management instructions in the target RF channel via the initial cluster manager, executing and forwarding the control and management instructions by the target network central node and each network sub-central node, executing the control and management instruction by other CTs in the network cluster and executing steps S4 to S6 repeatedly in a preset superframe work cycle

COMMUNICATION METHOD, DEVICE AND APPARATUS BASED ON WIRELESS AD-HOC NETWORK

INCORPORATION BY REFERENCE

This application claims the benefit of priority from China Patent Application No. 2024105006224 filed on Apr. 24 2024, the contents of which are hereby incorporated by reference in their entirety.

TECHNICAL FIELD

The present invention relates to the technical field of data communication, and relates specifically to a communication method, device and apparatus based on wireless ad-hoc network.

BACKGROUND TECHNOLOGY

In outdoor environments that positions can be changed at any moment, there are primarily the following several wireless cluster voice communication technologies: the first one is half duplex communication similar to "walky-talky", with such technology, although two-way communication can be realized at the same moment only transmission in one-way is possible, and with such technology, networking cannot be done; the second one is duplex communication using master-slave networking, wherein a device serves as a master device, and others are slave devices, with such technology simple networking can be done, however, all the devices are dependent on the master device, and with such technology ad-hoc networking cannot be realized. The third one is full-duplex communication by accessing operators' network, which is usually done by mobile application software, with such technology, although it is possible to realize networking, the present technology is dependent on coverage of the operators' network, communication is not available in areas not covered by base stations, and this is not suitable for outdoor environments that positions may change from hour to hour.

With the "walky-talky" style half-duplex communication, full duplex communication cannot be realized, the communication experience is poor; with the master-slave networking full duplex communication, the system is severely dependent on whether the master device is working normally, ad-hoc networking is not possible; and with the full duplex communication accessing the operators' network, the system is dictated by coverage of the operators' network, and does not work well in outdoor environments.

SUMMARY OF THE INVENTION

The present invention provides a communication method, device and apparatus based on wireless ad-hoc network, configured to provide good communication efficiency and rate of accuracy for communication based on wireless ad-hoc network.

On one aspect, the present invention provides a communication method based on wireless ad-hoc network, the communication method based on wireless ad-hoc network comprises: S1: conducting ad-hoc frequency tuning for a plurality of preset candidate communication terminals based on a target communication terminal and a target radio frequency channel, and obtaining target cluster communication information of the target communication terminal, wherein the target cluster communication information comprises: initial network topological information, initial data time slot scheduling information and an initial cluster manager;

S2: giving time division multiple access (TDMA) node analysis to the target communication terminal according to the target cluster communication information, obtaining target nodes, and after obtaining target nodes, having each of the plurality of candidate communication terminals enter an Ad-hoc TDMA communication mode;

S3: broadcasting the initial network topological information and the initial data time slot scheduling information in a preset broadcast channel, collecting in real time network topological information and data time slot scheduling information of each of the plurality of candidate communication terminals;

S4: screening the target communication terminal and the plurality of communication terminals for a network central node according to the real time network topological information of each of the plurality of candidate communication terminals, obtaining a target network central node, determining a current center communication terminal corresponding to the target network central node, determining a plurality of network sub-central nodes and the initial communication terminals corresponding to each of the plurality of network sub-central nodes based on the network topological information of the current center communication center;

S5: generating a list of centrality based on the current central communication terminal, wherein the list of centrality comprises the target network central node and the plurality of network sub-central nodes, generating a list of forwarding sequence, generating a data time slot scheduling table according to the data time slot scheduling information, sending or transmitting the list of center, the list of forwarding sequence, and the data time sequence distribution table in the target radio frequency channel;

S6: sending management and control instructions to the target radio frequency channel via the initial cluster manager, executing and transmitting the management and control instructions by the initial communication terminals corresponding to the target network central node and each of the plurality of network sub-central nodes, in the meanwhile, executing the management and control instruction by other communication terminals in the network cluster, and executing steps S4 to S6 repeatedly in a predetermined superframe periodical work cycle.

With reference to the first aspect, in one embodiment of the first aspect of the present invention, step S1 comprises:

using the target communication terminal as the initial network central node in the target radio frequency channel, and sending a POLL packet out in the target radio frequency channel;

based on the POLL packet, controlling the plurality of candidate communication terminals for time synchronization, and conducting data frequency alignment for the plurality of candidate communication terminals and the target communication terminal via a preset interaction control instruction; and during data frequency alignment, collecting the target cluster information of the target communication terminal, wherein the target cluster information comprises:

the initial network topological information, the initial data time slot scheduling information and the initial cluster manager.

In conjunction with the first aspect, in the second embodiment of the first aspect of the present invention, step S2 comprises:

the TDMA nodes comprise a master node and slave nodes, the candidate communication terminal that is the first one to enter the target radio frequency channel and sends the POLL packet out will be the master node and other candidate communication terminals will be the slave nodes;

controlling the plurality of candidate communication terminals for time synchronization based on the POLL packet after each of the plurality of candidate communication terminals are assigned the TDMA nodes, and entering the Ad-hoc TDAMA communication mode; and with a preset method, when the candidate communication terminal as the master node is lost, the other candidate communication terminals as the slave nodes can be converted to be a new master node.

In conjunction with the first aspect, in a third embodiment of the first aspect of the present invention, based on the POLL packet, controlling the plurality of candidate communication terminals for time synchronization, comprising:

conducting time division multiplexing time slot adjusting for each of the plurality of candidate communication terminals when each of the plurality of candidate communication terminals receives the POLL packet, obtaining the time division multiplexing time slot for each of the plurality of candidate communication terminals;

identifying synchronous marking packages of each of the plurality of candidate communication terminals when the plurality of candidate communication terminals have not received the POLL packet, and obtaining the synchronous marking packages of each of the plurality of candidate communication terminals;

conducting time division multiplexing time slot adjustment for each of the plurality of candidate communication terminals based on the synchronous marking packages of each of the plurality of candidate communication terminals, and obtaining the time division multiplexing time slots for each of the plurality of candidate communication terminals; and conducting time synchronization for the plurality of candidate communication terminals via the time division multiplexing time slots of each of the plurality of candidate communication terminals.

In conjunction with the first aspect, in a fourth embodiment of the first aspect of the present invention, the step S3 comprises:

broadcasting the initial network topological information and the initial data time slot scheduling information in a preset broadcasting channel;

collecting in real time the network topological information and the data time slot scheduling information of each of the plurality of candidate communication terminals via the broadcasting channel; or collecting the real time network topological information and the data time slot scheduling information of the communication terminals those are direct neighbors via the Ad hoc radio frequency channel.

In conjunction with the first aspect, in a fifth embodiment of the first aspect of the present invention, step S4 comprises:

analyzing network centrality scores of the target communication terminal and the plurality of communication terminals based on the real-time network topological information of each of the plurality of candidate communication terminals and obtaining a set of network centrality scores;

screening a network central node from the target communication terminal and the plurality of communication terminals based on the set of network centrality scores, obtaining a target network central node and determining the current central communication terminal corresponding to the target network central node; and determining a plurality of network sub-central nodes and the initial communication terminals corresponding to each of the plurality of network sub-central nodes based on the network topological information of the current central communication terminal.

In conjunction with the first aspect, in a sixth embodiment of the first aspect of the present invention, the step S5 comprises:

generating a list of centrality based on the current central communication terminal, wherein the list of centrality comprises the target network central node and the plurality of network sub-central nodes;

generating forwarding sequence information according to the list of centrality and generating a list of forwarding sequence according to the forwarding sequence information;

generating a data time slot scheduling table based on the data time slot scheduling information of the current central communication terminal;

sending the list of centrality, the forwarding sequence table and the data time slot scheduling table by the current central communication terminal, receiving the list of centrality, the forwarding sequence table and the data time slot scheduling table by the communication terminals corresponding to the target network sub-central nodes and transmitting the same, in the meanwhile, receiving the list of centrality, the forwarding sequence table and the data time slot scheduling table by the other communication terminals in the network cluster.

In conjunction with the first aspect, in a seventh embodiment of the first aspect of the present invention, the super-frame periodical work cycle comprises t multiframes, wherein t is a positive integer bigger than 1; the multiframes comprise m TDMA frames, wherein m is a positive integer bigger than 1.

A second aspect of the present invention provides a communication device based on wireless ad-hoc network, wherein the communication device based on wireless ad-hoc network comprises:

an acquisition module, configured to give Ad-hoc frequency alignment treatment to a plurality of preset candidate communication terminals based on a target communication terminal and a target radio frequency channel, and obtaining target cluster communication information of the target communication terminal, wherein the target cluster communication information comprises: initial network topological information, initial data time slot scheduling information and an initial cluster manager;

an analysis module, configured to give TDMA node analysis to the target communication terminal via the target cluster communication information, obtaining target nodes, and after obtaining the target nodes, entering each of the plurality of candidate communication terminals into an Ad-hoc TDMA communication mode;

a broadcasting module, configured to broadcast the initial network topological information, and the initial data time slot scheduling information in a preset broadcasting channel, and collecting in real time the real-time network topological information and the data time slot scheduling information of each of the plurality of candidate communication terminals;

a screening module, configured to screen a central network node from the target communication terminal and the plurality of communication terminals via the real-time network topological information of each of the plurality of candidate communication terminals, obtaining a target central network node, and determining a current central communication terminal corresponding to the target central node, and determining a plurality of less central network nodes and initial communication terminals corresponding to the plurality of less central network nodes based on the network topological information of the current central communication terminal;

a generation module, configured to generate a list of centrality based on the current central communication terminal, wherein the list of centrality comprises a target central network node and a plurality of less central network nodes, generating a forwarding sequence table according to the list of centrality, generating a data time slot scheduling table according to the data time slot scheduling information, and sending or transmitting the list of centrality, the forwarding sequence table and the data time slot scheduling table in the target radio frequency channel;

a recycling module, configured to send management and control instructions in the target radio frequency channel via the initial cluster manager, executing and transmitting the management and control instructions via the initial communication terminals corresponding to the target network central node and each of the less central network nodes, in the meanwhile, executing the management and control instruction by the other communication terminals in the network cluster and executing the step S4 to step S6 repeatedly in the preset superframe periodic work cycles.

A third aspect of the present invention provides a communication apparatus based on wireless ad-hoc network, comprising: a memory and at least one processor, instructions are stored in the memory; the at least one processor calls the instructions in the memory to have a communication device based on wireless ad-hoc network execute the communication method based on wireless ad-hoc network.

In the technical solutions provided in the present invention, there are simultaneously two communication standards, namely ad-hoc TDMA wireless communication and low power consumption Bluetooth (WiFi, GFSK or Zigbee), multiple links are working at the same time, interference immunity is good, synchronization of the multi-hop network is realized, the slave nodes and the master node and/or synchronized slave nodes are kept in synchronization, data time slots are appointed, before sending the data it is necessary to reserve the data time slot and the data are sent after appointment, data collision and interference can be avoided, multi user duplex voice communication is realized. A temporary communication network that is capable of ad-hoc networking, can be built, can be managed autonomously, with a good self-repair ability, is capable of free movement, multi-hop forwarding, and can change positions dynamically and quickly is built.

BRIEF DESCRIPTION OF DRAWINGS

To explain the technical solutions in embodiments of the present invention to a better extent, hereinafter, a simple introduction will be given to the drawings to be used in the description of the embodiments of the present invention, apparently, the drawings given in the following description show only some embodiments of the present invention, and for those of ordinary skill in the art, without paying creative effort, it is still possible to obtain other drawings based on the drawings given here.

FIG. 1 is a schematic diagram showing an embodiment of a communication method based on wireless ad-hoc network according to the present invention.

EMBODIMENTS

Figure 2:
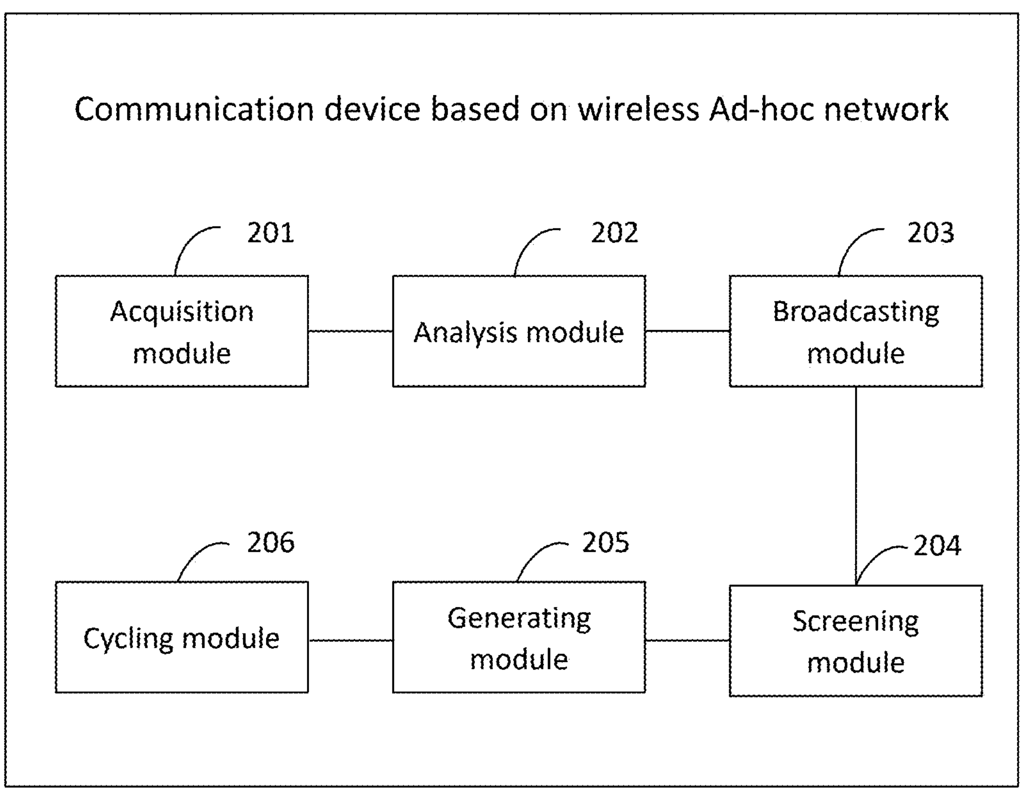
FIG. 2 is a schematic diagram showing an embodiment of a communication device based on wireless ad-hoc network according to the present invention.

Embodiments of the present invention provide a communication method, device and apparatus based on wireless ad-hoc network. In the description, claims and drawings of the present invention, terms "first", "second", "third", "fourth" etc. are employed to differentiate similar features, rather than describe a specific order or sequence. It shall be understood that, the data used in such conditions can be changed in appropriate cases, so as to have the embodiment given here to be implemented in an order other than shown in the drawings or the description. Furthermore, terms "comprising", "including" and variables thereof intend to be non-exclusive inclusion, for example, processes, methods, systems, products or devices including a series of steps or unit are not necessarily limited to the steps or units explicitly listed, and can include other processes, methods, systems, products or devices those are not clearly set forth or other steps or units those are intrinsic to the processes, methods, products or devices.

To ease understanding, hereinafter, a description will be given to the specific processes of the embodiments of the present invention, please refer to FIG. 1, an embodiment of the communication method based on wireless ad-hoc network comprises:

S1: giving ad-hoc frequency alignment to a plurality of preset candidate communication terminals based on a target communication terminal and a target radio frequency channel, obtaining target cluster communication information of the target communication terminal, wherein the target cluster communication information comprises: initial network topological information, initial data time slot scheduling information and an initial cluster manager;

It shall be comprehensible that, the executing party of the present invention can be a communication device based on wireless ad-hoc network, can also be a terminal or a server, which is not restricted on in the present invention. In embodiments of the present invention, examples are given by using a terminal as the executing party.

Specifically, in the target radio frequency channel, taking the target communication terminal as an initial network central node, and sending POLL packets out in the target radio frequency channel; based on the POLL packet, controlling the plurality of candidate communication terminals to be synchronous in time, and giving data frequency alignment to the plurality of candidate communication terminals and the target communication terminal via preset interaction and control instructions; during data frequency alignment, collecting the target cluster information of the plurality of candidate communication terminals, wherein the target cluster communication information comprises: the initial network topological information, the initial data time slot scheduling information and the initial cluster manager;

Wherein executing the step of controlling the plurality of candidate communication terminals for time synchronization in Ad-hoc frequency aligned status comprises: when each of the plurality of candidate communication terminals receives the POLL packet, giving time division multiplexing time slot adjustment to each of the plurality of candidate communication terminals, obtaining the time division multiplexing time slots of each of the plurality of candidate communication terminals; and with the time division multiplexing time slots of each of the plurality of candidate communication terminals, time synchronization of the plurality of candidate communication terminals can be done.

It shall be noted that, a wireless ad-hoc communication system is a temporary communication system capable of networking and independent management with a plurality of wireless receiving and sending terminals, with the wireless ad-hoc communication system a mobile communication system with multi-hop nodes can be built rapidly at any time at any place without depending on any base station. The nodes in the network can serve as both the terminal nodes or relay nodes to route and forward the data. Therefore the system is characterized in being able to ad-hoc networking, multi-hop routing and dynamically topological.

Each of the terminals has wireless multi-mode standards, wherein the wireless multi-mode standards comprise: a first standard is Ad-hoc TDMA wireless communication; a second standard is Bluetooth low energy (BLE) or Wi-Fi, or self-defined GFSK communication or Zigbee etc.

In the present invention, there are two communication states of the terminals, that is, frequency tuning state and service communication state. The frequency tuning state is for different terminals to obtain the same cluster communication information so that the different terminals can identify each other; the service communication state is to build a multi-hop network in different terminals and transmit useful information therein. Any two terminals can form a new communication cluster by frequency tuning. In the frequency tuning state, only the Ad-hoc wireless communication standard in the wireless multi-mode is worked on, and communication is done on an Ad-hoc frequency tuning channel. The Ad-hoc frequency tuning channel can be any channel but is assigned specifically. During frequency tuning the terminals can be divided into two categories, sender terminals and non-sender terminals. Upon frequency tuning entry, each of the terminals can be specially appointed to be the sender-terminal. In the same cluster, only one sender terminal is allowed. When a terminal is appointed to be a sender terminal and enters the frequency tuning state, the terminal will automatically be a TDMA master node, and can send POLL packet without scanning nor waiting and establish a TDMA communication mechanism.

When a non-sender terminal enters the frequency tuning state, the terminal will become a TDMA slave node automatically, scanning is to be continued to know whether there is a POLL packet. The scanning cycles are numbered, when reaching certain cycles, the terminal that enters at the very beginning will be converted to be a send terminal, and become a TDMA master node to send the POLL packet, establish the TDMA communication mechanism. When a non-sender terminal enters the frequency tuning state, when the POLL packet is found during scanning, the non-sender terminal will serve as a TDMA slave node, scanning is continued and the POLL packet is received and the slave node will positively reach the master node for TDMA synchronization (time synchronization, hereinafter abbreviated as time synchronization).

It shall be specially noted that, the POLL packet can be a NULL packet (a packet carrying only Header information in the MAC layer without carrying any Payload information), or a non-NULL packet (a packet carrying Header information in the MAC layer and carrying the Payload information), and the time synchronization method does not depend on whether in the POLL packet there is the Payload information. Wireless communication in the frequency tuning state comprises a TDMA master-slave communication method managed by the master node, communication between the slave nodes is not allowed, and the slave nodes can only communicate with the master node. Therefore, the frequency tuning state does not support multi-hop network time synchronization, and time synchronization can be realized only after all the terminals receive the POLL packet sent from the master node.

After establishing the TDMA communication mechanism, the master node will generate cluster communication information, wherein the cluster communication information comprises: the cluster manager, the cluster network address, a list of Ad-hoc service communication radio frequency channels, address of a node of the current terminal in the cluster and physical addresses of cluster members in the wireless second standard;

Wherein the cluster manager can be appointed to be the sender terminal; the cluster network address is a piece of unique address information, configured for identification of different clusters; the list of Ad-hoc service communication radio frequency channels comprises n channels, serving as a basis of subsequent frequency hopping; node addresses, wherein the master node will obtain a first assigned node address, addresses of the slave nodes will be generated during a control and instruction interaction stage, based on a sequence of the slave nodes requesting interaction. In the Ad-hoc frequency tuning channel, a terminal as the slave node will send control instruction interaction to a terminal as the master node, the master node will appoint a node address in the cluster for the slave node upon receipt of the interaction information, and the master node will transmit the finally generated cluster communication information to the slave node after response. The wireless second standard physical address of the cluster members are configured to identify and judge whether senders of the broadcasting information that is scanned in the broadcasting channel are members of the present cluster. All the nodes will store the obtained cluster information. Each of the terminals can store a plurality of cluster communication information but can only activate one of the plurality of cluster communication information for working.

S2: giving TDMA node analysis to the target communication terminal based on the target cluster communication information, obtaining the target nodes, and after obtaining the target cluster communication information, entering each of the plurality of candidate communication terminals into an Ad-hoc TDMA communication mode;

Specifically, the TDMA nodes comprise a master node and slave nodes, one of the plurality of candidate communication terminals that is the first to enter the target radio frequency channel and sends the POLL packet out will be the master node, the other candidate communication terminals will be the slave nodes; when each of the plurality of candidate communication terminals is assigned the TDMA nodes, based on the POLL packet, controlling the plurality of candidate communication terminals for time synchronization, and entering the Ad-hoc TDMA communication mode; by a preset method, when the candidate communication terminal serving as the master node is lost, the other candidate communication terminals as the slave nodes can be converted to be a new master node.

Executing the step of controlling the plurality of candidate communication terminals for time synchronization based on the POLL packet, comprising: when each of the plurality of candidate communication terminals receives the POLL packet, giving time division multiplexing time slot adjustment to each of the plurality of candidate communication terminals, and obtaining the time division multiplexing time slot of each of the plurality of candidate communication terminals; when the plurality of candidate communication terminals have not received the POLL packet, conducting synchronization mark packet identification for each of the plurality of candidate communication terminals, and obtaining the synchronization mark packet of each of the plurality of candidate communication terminals; and conducting time synchronization for the plurality of candidate communication terminals via the TDMA time slots of each of the plurality of candidate communication terminals.

After power-on, each of the terminals will read currently activated cluster communication information, enter corresponding Ad-hoc service communication radio frequency channel and be ready for the service communication state.

In the Ad-hoc service communication mode, all the terminals can be divided into two roles in the TDMA, the master node and the slave nodes respectively, there is only one master node, and the others are slave nodes. Each of the terminals will compete at the time of entering the service communication mode and the terminal that is the first one to enter will preferably be the master node, and the generation steps are as follows:

Traversing and listening each of the channels in the list of radio frequency channels for the POLL packet by each of the terminals entering the Ad-hoc service communication radio frequency channel. If the POLL packet has not been listened in a current channel, switching to the next channel in the list and continuing listening. When the POLL packet is not listened until traversing all the channels in the list, marking as a work cycle, listening again from the first channel in the list periodically, and marking as the next work cycle.

During listening, each of the terminals needs to number the work cycle, when the number of work cycle reaches a value N, and the POLL packet has not been listened, the current terminal can automatically become the master node, be switched to the first channel in the Ad-hoc service communication radio frequency channels, and start sending the POLL packet out.

During listening, when each of the terminals receives the POLL packet when the number of work cycles has not reached the value N, the terminal will become a slave node, and stay in the current Ad-hoc service communication radio frequency channel.

It shall be specifically noted that, in the present invention, when the candidate communication terminal as the master node is lost, in a predetermined way, the other candidate communication terminals as the slave nodes can be converted to be a new master node, and the predetermined way is as follows: the efficient time of the nodes is permanent, not correlated to the TDMA working state, when the terminal as the master node is online, the master node in the cluster will not be changed. However, if the master node is offline in the cluster, the other terminals as the slave nodes need to number the offline cycles, when the numbered cycles reach the value N and the POLL packet is not received, the terminal as the network central node will become the master node.

Further, it is noteworthy that, the POLL packet can be a NULL packet (a packet carrying only Header information in the MAC layer while not carrying any Payload information), or a non-NULL packet (a packet carrying both the Header information in the MAC layer and carrying the Payload information), further, the time synchronization method does not depend on whether the Payload information is carried in the POLL packet.

The multi-hop network time synchronization methods between the master node and the slave nodes comprise the following two methods:

Approach one, synchronization is realized by having the slave nodes to be dependent on the POLL packet. When the slave nodes and the master node are directly adjacent, the slave nodes can realize time synchronization based on the POLL packet received.

Approach two, synchronization can be realized by having the slave nodes to be dependent on any type of packet sent by any synchronized slave nodes. For any slave node that has realized time synchronization, by marking any type of packet sent to be synchronized, upon receipt of such packet sent by the synchronized slave node, the other slave nodes can realize time synchronization by depending on the packet. Therefore, in the multi-hop network, for any two slave nodes, once one of them is synchronized, the two can realize synchronization.

It shall be noted that, time synchronization comprises TDMA time slot starting time synchronization and TDMA time slot serial number synchronization.

Further, TDMA time slot starting time synchronization, comprising upon receipt of the POLL packet or any packet from a synchronized node, the receiver calculates wireless transmission time delay At according to a length of the received POLL packet or the packet, calculates the time offset value AT in conjunction with the local receiving time k, finally adjusts the local time slots to realize time slot starting time synchronization between different nodes. The time slot starting time synchronization method does not rely on the Payload information in the POLL packet or any packet of the synchronized node.

Further, TDMA time slot serial number synchronization, comprising realizing time slot serial number synchronization by a receiver upon receipt of the POLL packet or any packet from a synchronized node based on the Header information in the MAC layer of the received packet. The serial number synchronization method does not rely on the Payload information of the POLL packet or the packet from the synchronized node.

S3: broadcasting the initial network topological information, the initial data time slot scheduling information in a preset broadcasting channel and collecting in real time the real time network topological information and the data time slot scheduling information of each of the candidate communication terminals;

Specifically, broadcasting the initial network topological information, the initial data time slot scheduling information in the preset broadcasting channel; collecting in real time the real time network topological information and the data time slot scheduling information of each of the candidate communication terminals via the broadcasting channel, or collecting the real time network topological information and the data time slot scheduling information of the communication terminals that are directly adjacent via the Ad-hoc radio frequency channel.

Specifically, each of the terminals has two wireless standards, the broadcasting channel comprises the second standard, comprising any of BLE, WiFi, self-defined GFSK communication or Zigbee, in the present invention the description is given based on BLE, however, it shall be noted that the present invention is not limited to that the second standard is BLE. After entering the service communication state, the current terminal will obtain immediate neighbors thereof based on the following method: the current terminal can directly receive any type of packet of the target terminal in the Ad-hoc service communication radio frequency channel; the current terminal can directly scan the broadcasting of the target terminal by scanning the BLE broadcasting data; when any of the foregoing two conditions is met, the target terminal of the current terminal is set to be an immediate neighbor thereof. In the meanwhile, when the current terminal has a data packet to send, a mark is to be set, showing that the current terminal needs to appoint the data time slot. For messages from other terminals obtained by the current terminal by scanning the BLE broadcast, judging whether the massages are the latest messages according to the serial numbers of the messages, if the serial numbers are the latest, as the messages contain the topological information and the data time slot scheduling information of the other terminals, they are to be combined with the network topological information and the data time slot scheduling information of the current information, and the combined data can be regarded as the latest network topological information of the current terminal. After updating the latest information, the current terminal broadcasts the latest network topological information and the latest data time slot scheduling information in the BLE broadcasting channel, and the broadcasting of the current terminal is independent, continuous and in real time, not correlated to the Ad-hoc working state. It is noteworthy that, by analyzing the BLE broadcasting information, each of the terminals can acquire the network topological information and the time slot appointment information of all the terminals (including but not limited to direct neighbors) in the network, so as to renew the network topological information and the time slot appointment information thereof.

S4: screening a network central node from the target communication terminal and the plurality of communication terminals by the real time network topological information of each of the candidate communication terminals, obtaining a target network central node, determining a current central communication terminal corresponding to the target network central node, and determining a plurality of network sub-central nodes and the initial communication terminals corresponding to the plurality of network sub-central nodes based on the network topological information of the current central communication terminal;

Specifically, analyzing the target communication terminal and the plurality of communication terminals for network centrality values based on the real time network topological information of each of the candidate communication terminals and obtaining a set of network centrality values; screening the target communication terminal and the plurality of communication terminal for the network central node based on the set of network centrality values, and obtaining the target network central node and the current central communication terminal corresponding to the target network central node; and determining a plurality of network sub-central nodes and the initial communication terminals corresponding to each of the network sub-central nodes based on the network topological information of the current central communication terminal.

Specifically, the network topological information and the data time slot scheduling information of each of the terminals can be updated in real time, however, the information is not treated in real time, as Ad-hoc TDMA communication conducts periodical work based on superframes. A superframe comprises t multiframes, the multiframes are formed based on m TDMA frames, and the TDMA frames compose of n time slots, and the time slot is the smallest time division in Ad-hoc wireless communication. The network central node comprises the terminal at the central position of the network, and an election method thereof is to calculate a terminal with the highest network centrality based on the latest network topological information. In the present invention, the network central node will be re-elected every time before starting each of the superframes.

At the initial stage of service communication, as the network topological information has not yet been transmitted completely, the master node can be appointed as the initial network central node. Before starting each of the superframes, the terminal as the current network central node will calculate a rank of network centrality according to the latest network topological information and elect the terminal with the highest network centrality as a new network central node for the next superframe. If two or more terminals have the same network centrality, the terminal that enters the cluster network earlier will be preferably elected. The terminal as the current network central node will send the newly calculated new network central node in a control time slot corresponding to the Ad-hoc radio frequency channel prior to starting each of the superframes.

It shall be specially noted that, when the current network central node is offline before sending the newly calculated new network central node, the terminals as the network sub-central nodes will continue to act as the network sub-central nodes before receiving the control appointment instruction, and number the offline cycles, when the numbered cycles reach a value N and the control packet from the network central node is not yet delivered, the terminals as the network sub-central nodes will compete sequentially to be the current network central node as per an order of centrality, and substitute the current network central node to issue the new network central node.

S5: generating the list of centrality based on the current central communication terminal, wherein the list of centrality comprises the target network central node and a plurality of network sub-central nodes, generating a list of forwarding sequence according to the list of centrality, generating the data time slot appointment table according to the data time slot scheduling information, and sending or transmitting the list of centrality, the table of forwarding sequence and the data time slot appointment table;

Specifically, generating the list of centrality based on the current central communication terminal, wherein, the list of centrality comprises the target network central node and the plurality of network sub-central nodes; generating the forwarding sequence information based on the list of centrality, and generating the table of forwarding sequence based on the forwarding sequence information; generating the data time slot appointment table based on the data time slot scheduling information of the current central communication terminal; the current central communication terminal sends the list of centrality, the table of forwarding sequence and the data time slot appointment table in the target radio frequency channel, the communication terminal corresponding to the target network sub-central node receives the list of centrality, the table of forwarding sequence and the data time slot appointment table and forwards them, at the same time, the other communication terminals in the network cluster receive the list of centrality, the table of forwarding sequence and the data time slot appointment table. Before starting the superframe, the terminal receiving the new network central node control information will judge whether the new network central node matches the current terminal.

If the new network central node does not match the current terminal, and the current terminal is a member in the list of centrality, the current terminal will forward as per the sequence in the table of forwarding sequence, and not forward to those not a member of the list of centrality.

If the new network central node matches the current terminal, the current terminal will be taken as a root node, 0-4 terminals will be selected as the sub-central nodes, plus the current terminal as the central node, the list of centrality containing 1-5 terminals will be generated.

It shall be specifically pointed out that, the network central node and sub-central nodes in the list of centrality will be arranged as per a sequence of strong to weak centralities, and the first terminal in the list of centrality will be the network central node.

It shall be specifically noted that, a set of immediate neighbors formed by the list of centrality generated by the new network central node is to cover all the terminals in the network.

The new network central node and the newly generated sub-central nodes have forwarding right. The forwarding right works for all time slots during Ad-hoc TDMA wireless communication, comprising control time slots and data time slots. Nodes other than the network central node and the network sub-central nodes can only receive rather than forward. The new network central node will judge the neighborhood relationship between the terminals according to the latest network topological information and the list of centrality and generate the table of forwarding sequence. The table of forwarding sequence will instruct the forwarding sequence of all the members of the list of centrality.

It shall be noted that, the control instruction or the data packet sent by any terminal can be transmitted to all the terminals in the multi-hop network when forwarded by the network central node and the network sub-central nodes.

The new network central node will manage the data time slots in the present superframe and generate the data time slot scheduling table by scanning the BLE broadcasting and obtaining the latest data time slot scheduling information of all the terminals.

The terminal serving as the new network central node will generate control information of the complete list of centrality, the table of forwarding sequence and the data time slot scheduling table and send it in the control time slots corresponding to the Ad-hoc radio frequency channel. The terminal serving as the new network sub-central node need to forward the list of centrality, the table of forwarding sequence and the data time slot scheduling table upon receipt from the new network central node, and the other communication terminals in the network cluster receive it and forwarding is not required.

It shall be pointed out that, upon receipt of the latest list of centrality, if the latest list of centrality is not consistent with the current list of centrality, the current members of the list of centrality will lose the right to serve as the members of the list of centrality and new members of the list of centrality will be assigned.

S6: sending the management and control instruction in the target radio frequency channel by the initial cluster manager, executing and forwarding the management and control instruction by the initial communication terminals corresponding to the target network central node and each of the network sub-central nodes, in the meanwhile, executing the management and control instruction by the other communication terminals in the network cluster, and executing steps S4 to S6 in preset superframe periodic working cycles.

It shall be noteworthy that, the superframe periodic working cycles comprise t superframes, wherein t is a positive integer bigger than 1. The terminal serving as the cluster manager will send the cluster management and control instruction in the control time slots corresponding to the Ad-hoc radio frequency channel. The control instruction will be transmitted to all the terminals in the multi-hop network upon forwarding by the network central node and the network sub-central nodes.

The cluster management and control instructions comprise: instructions those all terminals are to execute; and instructions that designated terminals are to execute, in the present invention, all the TDMA time slots can be divided into two types, control time slots and data time slots. For all the terminals for Ad-hoc TDMA communication, no matter what roles or types they are, each of the terminals has at least one control time slot. However, data time slots are to be applied by the data time slot appointment mechanism, and upon appointment confirmation of the network central node, the terminal is entitled to send data time slots, therefore, not all terminals are entitled to send data time slots at any time.

It shall be pointed out that, although data of all the terminals are not transmitted in real time, in the present invention, data time slots of at most 4 different terminals can be sent in parallel, therefore, for cluster voice communication experience, full duplex voice communication is realized.

After the network central node and the network sub-central nodes forward the data time slot appointment table, each of the terminals can access the data time slot appointment table, and judge whether it is entitled to send data time slots. In the data time slot appointment table, which terminals are entitled to send data time slots is stipulated, in addition, the sending order of each of the terminals entitled to send data time slot is designated, and with the appointment table, possible collision and interference of different terminals when sending data can be avoided. After the terminals those are entitled to send data time slots send the data packets at the designated data time slots, the terminals as the network central node or the network sub-central nodes will forward automatically according to the forwarding sequence table upon receipt of the data packet, so as to ensure that the data packets can be transmitted to all the terminals.

In the present invention, frequency tuning occurs at the initial stage of establishing the cluster. The master node and the slave nodes occur only at the initial stage of the service communication state. The real time independent work on the second standard BLE on the multi-mode wireless device is to transmit the latest network topological information and the data time slot scheduling information. Therefore, only steps S4-S6 are periodic Ad-hoc TDMA jobs, and the work cycle comprises a superframe.

In the embodiments of the present invention, two wireless communication standards, namely Ad-hoc TDMA wireless communication and BLE (or WiFi, GFSK, Zigbee) are provided, multiple links are working synchronously, interference immunity multi-hop network is synchronous in time, the slave nodes are synchronous as the master node or as the synchronized slave nodes, the data time slot appointment mechanism is used, before sending the data, appointment of the data time slots shall be made, and sending is allowed only after appointment approved, data collision and interference is avoided, and multiple person duplex voice communication is realized. A temporary communication network with Ad-hoc networking ability, that can be built and managed independently, with a good self-recovery ability, can move freely, can manage multi-hop forwarding and can change positions dynamically and quickly is built.

In the foregoing paragraphs, a description is given to the communication method based on wireless Ad-hoc network, and hereinafter, the communication device based on wireless Ad-hoc network in an embodiment of the present invention will be described with reference to FIG. 2, wherein an embodiment of the communication device based on wireless Ad-hoc network comprises:

An acquisition module 201, configured to give Ad-hoc frequency tuning treatment to a plurality of preset candidate communication terminals based on a target communication terminal and a target radio frequency channel, and obtaining target cluster communication information of the target communication terminal, wherein the target cluster communication information comprises: initial network topological information, initial data time slot scheduling information and an initial cluster manager;

An analysis module 202, configured to analyze TDMA nodes for the target communication terminal via the target cluster communication information, obtaining the target nodes, after obtaining the target nodes, entering each of the plurality of candidate communication terminals into an Ad-hoc TDMA communication mode;

A broadcasting module 203, configured to broadcast the initial network topological information, the initial data time slot scheduling information in a preset broadcasting channel, and collecting in real time real time network topological information and the data time slot scheduling information of each of the plurality of candidate communication terminals;

A screening module 204, configured to screen the target communication terminal and the plurality of communication terminal for a network central node via the real time network topological information of each of the plurality of candidate communication terminals, obtaining the target network central node, determining a current central communication terminal corresponding to the target network central node, and determining a plurality of network sub-central nodes and the initial communication terminals corresponding to the plurality of network sub-central nodes based on the network topological information of the current central communication terminal;

A generating module 205, configured to generate a list of centrality based on the current central communication terminal, wherein the list of centrality comprises the target network central node and the plurality of network sub-central nodes, generating a forwarding sequence table according to the list of centrality, generating a data time slot scheduling table based on the data time slot scheduling information, sending or forwarding the list of centrality, the forwarding sequence table and the data time slot scheduling table in the target radio frequency channel;

A cycling module 206, configured to send control and management instructions in the target radio frequency channel by the initial cluster manager, executing and forwarding the control and management instructions by the initial communication terminals corresponding to the target network central node and each of the plurality of network sub-central nodes, at the same time, executing the control and management instruction by other communication terminals in the network cluster, and repeatedly executing steps S4-S6 in a preset superframe work cycle.

By synergic coordination of the modules, the present invention is provided with two wireless communication standards, namely Ad-hoc TDMA wireless communication and BLE (or WiFi, GFSK, or Zigbee), multiple links are working synchronously, the interference immune multi-hop network is synchronous in time, the slave nodes are synchronous to the master node, and synchronous to synchronized slave nodes, the data time slots are scheduled, before sending the data, it is necessary to appoint the data time slots, and the data can be sent after being allocated the data time slots, data collision and interference can be avoided and multiple person duplexing voice communication is realized. A temporary communication network with ad-hoc networking ability, that can be built, managed independently, with a good self-repair ability, can move freely, is capable of multi-hop forwarding, and can change position quickly and dynamically is built.

The present invention further provides a communication apparatus based on wireless Ad-hoc network, the communication apparatus based on wireless Ad-hoc network comprises a memory and a processor, computer readable instructions are stored in the memory, and the computer readable instructions when being executed by the processor will have the processor execute the steps of the communication method based on wireless Ad-hoc network as set forth in the foregoing embodiments.

Those skilled in the art can readily appreciate that, to ease description, for specific working processes of the above-mentioned system and units corresponding processes in the foregoing method embodiments can be referred to, and will not be repeated here.

When being sold or used in the form of software functional units and as an independent product, the integrated unit can be stored in a computer readable storage medium. Based on such understanding, the contributive portions of the present invention over the prior art or all or some of the present technical solutions can be implemented in the form of software products, the computer software product is stored in a memory, comprising instructions for having a computer device (a personal computer, server or a network device) to execute all or some steps of the method as set forth in the embodiments of the present invention. And the memory comprises: media those can be used to store program codes such as U disk, mobile hard disk, read-only memory, random access memory, magnetic disk, or optical disk.

The foregoing embodiments are only intended to explain the technical solutions of the present invention rather than limit them; although a detailed description is given to the present invention with reference to the foregoing embodiments, those of ordinary skill in the art shall understand that: it is still possible to modify the technical solutions recited in the foregoing embodiments or conduct equivalent replacement to some technical features in the embodiments; and the modifications or replacement shall not deviate the essence of the present invention from the spirit and scope of the technical solutions in the embodiments of the present invention.

The invention claimed is:

1. A communication method based on wireless ad-hoc network, the communication method based on wireless ad-hoc network comprises: S1: conducting ad-hoc frequency tuning for a plurality of preset candidate communication terminals based on a target communication terminal and a target radio frequency channel, and obtaining target cluster communication information of the target communication terminal, wherein the target cluster communication information comprises: initial network topological information, initial data time slot scheduling information and an initial cluster manager;

S2: giving time division multiple access (TDMA) node analysis to the target communication terminal according to the target cluster communication information, obtaining target nodes, and after obtaining target nodes, having each of the plurality of candidate communication terminals enter an Ad-hoc TDMA communication mode;

S3: broadcasting the initial network topological information and the initial data time slot scheduling information in a preset broadcast channel, collecting in real time network topological information and data time slot scheduling information of each of the plurality of candidate communication terminals;

S4: screening the target communication terminal and the plurality of communication terminals for a network central node according to the real time network topological information of each of the plurality of candidate communication terminals, obtaining a target network central node, determining a current center communication terminal corresponding to the target network central node, determining a plurality of network sub-central nodes and the initial communication terminals corresponding to each of the plurality of network sub-central nodes based on the network topological information of the current center communication center;

S5: generating a list of centrality based on the current central communication terminal, wherein the list of centrality comprises the target network central node and the plurality of network sub-central nodes, generating a list of forwarding sequence, generating a data time slot scheduling table according to the data time slot scheduling information, sending or transmitting the list of center, the list of forwarding sequence, and the data time sequence distribution table in the target radio frequency channel;

S6: sending management and control instructions to the target radio frequency channel via the initial cluster manager, executing and transmitting the management and control instructions by the initial communication terminals corresponding to the target network central node and each of the plurality of network sub-central nodes, in the meanwhile, executing the management and control instruction by other communication terminals in the network cluster, and executing steps S4 to S6 repeatedly in a predetermined superframe periodical work cycle.

2. The communication method based on wireless ad-hoc network according to claim 1, wherein step S1 comprises:

using the target communication terminal as the initial network central node in the target radio frequency channel, and sending a POLL packet out in the target radio frequency channel;

based on the POLL packet, controlling the plurality of candidate communication terminals for time synchronization, and conducting data frequency alignment for the plurality of candidate communication terminals and the target communication terminal via a preset interaction control instruction; and during data frequency alignment, collecting the target cluster information of the target communication terminal, wherein the target cluster information comprises: the initial network topological information, the initial data time slot scheduling information and the initial cluster manager.

3. The communication method based on wireless ad-hoc network according to claim 1, wherein, step S2 comprises:

the TDMA nodes comprise a master node and slave nodes, the candidate communication terminal that is the first one to enter the target radio frequency channel and sends the POLL packet out will be the master node and other candidate communication terminals will be the slave nodes;

controlling the plurality of candidate communication terminals for time synchronization based on the POLL packet after each of the plurality of candidate communication terminals are assigned the TDMA nodes, and entering the Ad-hoc TDAMA communication mode; and with a preset method, when the candidate communication terminal as the master node is lost, the other candidate communication terminals as the slave nodes can be converted to be a new master node.

4. The communication method based on wireless ad-hoc network according to claim 3, wherein based on the POLL packet, controlling the plurality of candidate communication terminals for time synchronization, comprising:

conducting time division multiplexing time slot adjusting for each of the plurality of candidate communication terminals when each of the plurality of candidate communication terminals receives the POLL packet, obtaining the time division multiplexing time slot for each of the plurality of candidate communication terminals;

identifying synchronous marking packages of each of the plurality of candidate communication terminals when the plurality of candidate communication terminals have not received the POLL packet, and obtaining the synchronous marking packages of each of the plurality of candidate communication terminals;

conducting time division multiplexing time slot adjustment for each of the plurality of candidate communication terminals based on the synchronous marking packages of each of the plurality of candidate communication terminals, and obtaining the time division multiplexing time slots for each of the plurality of candidate communication terminals; and conducting time synchronization for the plurality of candidate communication terminals via the time division multiplexing time slots of each of the plurality of candidate communication terminals.

5. The communication method based on wireless ad-hoc network according to claim 1, wherein the step S3 comprises:

broadcasting the initial network topological information and the initial data time slot scheduling information in a preset broadcasting channel;

collecting in real time the network topological information and the data time slot scheduling information of each of the plurality of candidate communication terminals via the broadcasting channel; or collecting the real time network topological information and the data time slot scheduling information of the communication terminals those are direct neighbors via the Ad hoc radio frequency channel.

6. The communication method based on wireless ad-hoc network according to claim 1, wherein step S4 comprises:

analyzing network centrality scores of the target communication terminal and the plurality of communication terminals based on the real-time network topological information of each of the plurality of candidate communication terminals and obtaining a set of network centrality scores;

screening a network central node from the target communication terminal and the plurality of communication terminals based on the set of network centrality scores, obtaining a target network central node and determining the current central communication terminal corresponding to the target network central node; and determining a plurality of network sub-central nodes and the initial communication terminals corresponding to each of the plurality of network sub-central nodes based on the network topological information of the current central communication terminal.

7. The communication method based on wireless ad-hoc network according to claim 1, wherein, the step S5 comprises:

generating a list of centrality based on the current central communication terminal, wherein the list of centrality comprises the target network central node and the plurality of network sub-central nodes;

generating forwarding sequence information according to the list of centrality and generating a list of forwarding sequence according to the forwarding sequence information;

generating a data time slot scheduling table based on the data time slot scheduling information of the current central communication terminal;

sending the list of centrality, the forwarding sequence table and the data time slot scheduling table by the current central communication terminal, receiving the list of centrality, the forwarding sequence table and the data time slot scheduling table by the communication terminals corresponding to the target network sub-central nodes and transmitting the same, in the meanwhile, receiving the list of centrality, the forwarding sequence table and the data time slot scheduling table by the other communication terminals in the network cluster.

8. The communication method based on wireless ad-hoc network according to claim 1, wherein the superframe periodical work cycle comprises t multiframes, wherein t is a positive integer bigger than 1; the multiframes comprise m TDMA frames, wherein m is a positive integer bigger than 1.

9. A communication device based on wireless ad-hoc network, wherein the communication device based on wireless ad-hoc network comprises:

an acquisition module, configured to give Ad-hoc frequency alignment treatment to a plurality of preset candidate communication terminals based on a target communication terminal and a target radio frequency channel, and obtaining target cluster communication information of the target communication terminal, wherein the target cluster communication information comprises: initial network topological information, initial data time slot scheduling information and an initial cluster manager;

an analysis module, configured to give TDMA node analysis to the target communication terminal via the target cluster communication information, obtaining target nodes, and after obtaining the target nodes, entering each of the plurality of candidate communication terminals into an Ad-hoc TDMA communication mode;

a broadcasting module, configured to broadcast the initial network topological information, and the initial data time slot scheduling information in a preset broadcasting channel, and collecting in real time the real-time network topological information and the data time slot scheduling information of each of the plurality of candidate communication terminals;

a screening module, configured to screen a central network node from the target communication terminal and the plurality of communication terminals via the real-time network topological information of each of the plurality of candidate communication terminals, obtaining a target central network node, and determining a current central communication terminal corresponding to the target central node, and determining a plurality of less central network nodes and initial communication terminals corresponding to the plurality of less central network nodes based on the network topological information of the current central communication terminal;

a generation module, configured to generate a list of centrality based on the current central communication terminal, wherein the list of centrality comprises a target central network node and a plurality of less central network nodes, generating a forwarding sequence table according to the list of centrality, generating a data time slot scheduling table according to the data time slot scheduling information, and sending or transmitting the list of centrality, the forwarding sequence table and the data time slot scheduling table in the target radio frequency channel;

a recycling module, configured to send management and control instructions in the target radio frequency channel via the initial cluster manager, executing and transmitting the management and control instructions via the initial communication terminals corresponding to the target network central node and each of the less central network nodes, in the meanwhile, executing the management and control instruction by the other communication terminals in the network cluster and executing the step S4 to step S6 repeatedly in the preset superframe periodic work cycles.

10. A communication apparatus based on wireless ad-hoc network, comprising: a memory and at least one processor, instructions are stored in the memory; the at least one processor calls the instructions in the memory to have a communication device based on wireless ad-hoc network execute the communication method based on wireless ad-hoc network according to claim 1.

* * * * *